US010819687B2

(12) United States Patent
Yin

(10) Patent No.: US 10,819,687 B2
(45) Date of Patent: Oct. 27, 2020

(54) APPARATUS AND METHOD OF ENCRYPTED COMMUNICATION

(71) Applicant: TENCENT TECHNOLOGY (SHENZHEN) COMPANY LIMITED, Shenzhen (CN)

(72) Inventor: Tengfei Yin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 333 days.

(21) Appl. No.: 15/948,056

(22) Filed: Apr. 9, 2018

(65) Prior Publication Data

US 2018/0234399 A1    Aug. 16, 2018

Related U.S. Application Data

(63) Continuation of application No. PCT/CN2017/072292, filed on Jan. 23, 2017.

(30) Foreign Application Priority Data

Feb. 2, 2016   (CN) .......................... 2016 1 0072662

(51) Int. Cl.
    *G06F 21/00*   (2013.01)
    *H04L 29/06*   (2006.01)
    (Continued)

(52) U.S. Cl.
    CPC .......... *H04L 63/0471* (2013.01); *G06F 21/31* (2013.01); *G06F 21/60* (2013.01);
    (Continued)

(58) Field of Classification Search
    CPC ...... G06F 21/60; G06F 21/602; G06F 21/604; G06F 21/606; G06F 21/62; G06F 21/6209; H04L 9/12; H04L 9/14; H04L 9/16
    See application file for complete search history.

(56) References Cited

U.S. PATENT DOCUMENTS 7,877,594 B1    1/2011   DiSanto et al.
2007/0162554 A1   7/2007   Branda et al.
(Continued)

FOREIGN PATENT DOCUMENTS

CN    1645827 A      7/2005
CN    104539517 A    4/2015
(Continued)

OTHER PUBLICATIONS

International Search Report dated Feb. 2, 2016 in Application No. PCT/CN2017/072292.
(Continued)

*Primary Examiner* — Edward Zee
(74) *Attorney, Agent, or Firm* — Oblon, McClelland, Maier & Neustadt, L.L.P.

(57) ABSTRACT

A method of encrypted communication by a terminal device is described. An encryption request for a message is obtained by processing circuity of the terminal device. The encryption request includes an identifier of an encryption routine and an encryption key. The encryption routine is identified according to the identifier of the encryption routine included in the encryption request. An encrypted message is generated by the processing circuity of the terminal device by encrypting the message using the identified encryption routine and the encryption key included in the encryption request. Moreover, a data packet is generated by the processing circuity of the terminal device by performing a packet assembly pro-
(Continued)

cess on the encrypted message. The data packet is sent to another device via a network.

20 Claims, 7 Drawing Sheets

(51) Int. Cl.
G06F 21/60 (2013.01)
G06F 21/31 (2013.01)
H04L 12/58 (2006.01)

(52) U.S. Cl.
CPC .......... *G06F 21/602* (2013.01); *G06F 21/604* (2013.01); *H04L 63/0428* (2013.01); *H04L 63/0485* (2013.01); *H04L 51/04* (2013.01); *H04L 63/06* (2013.01)

(56) References Cited

U.S. PATENT DOCUMENTS

2010/0306540 A1* 12/2010 Yamada ................ H04L 9/3242
713/168
2018/0007015 A1 1/2018 Zhang et al.

FOREIGN PATENT DOCUMENTS

| CN | 105141635 A | 12/2015 |
| CN | 105262756 A | 1/2016 |
| EP | 1 775 907 A2 | 4/2007 |

OTHER PUBLICATIONS

Pen G Li, Wang Bin-wen, "Design and Implementation of Instant Messenger System Server", Microcomputer Development, vol. 14, No. 10, Oct. 2004.
Mao, et al., "Study on the PKI Protective Countermeasures of Instant Messaging", Journal of Hunan Institute of Humanities, Science and Technology, No. 4., Aug. 2007.
Xu, et al., Secure Protective Strategy Based on Instant Messaging:, Computer Engineering, vol. 33, No. 21, Nov. 2007.
PCT International Preliminary Report dated Aug. 7, 2018 in PCT/CN2017/072292 (with English translation), 4 pages.
PCT Written Opinion of the International Searching Authority dated Apr. 11, 2017 in PCT/CN2017/072292 (with English translation), 7 pages.
Chinese Office Action dated Mar. 11, 2019 in Application No. 201610072662.9 with English translation, 9 pages.

* cited by examiner

APPARATUS AND METHOD OF ENCRYPTED COMMUNICATION

RELATED APPLICATION

This application is a continuation of International Application No. PCT/CN2017/072292, filed on Jan. 23, 2017, which claims priority to Chinese Patent Application No. 201610072662.9, entitled "Message Encryption and Decryption Method and Device" filed on Feb. 2, 2016. The entire disclosures of the prior applications are hereby incorporated by reference herein in their entirety.

FIELD OF THE TECHNOLOGY

The present disclosure relates to the field of information security technologies, and specifically, to an apparatus and method of encrypted communication, such as a message encryption method and apparatus, and a message decryption method and apparatus.

BACKGROUND OF THE DISCLOSURE

Currently, people's life is full of various types of data, and data processing is required in almost all fields. Data security is even related to people's life and property safety.

For example, for an enterprise, chat messages among its employees in the workplace may include sensitive contents, as the chat messages may relate to relatively confidential core information of the enterprise, and therefore are significant to the enterprise. Therefore, for the enterprise, it is necessary to encrypt the chat messages of the employees in the workplace, to prevent the chat messages from being stolen by an unauthorized person, and ensure security of the chat messages in the enterprise.

Currently, an enterprise instant messaging (IM) client application is usually used among employees of an enterprise to exchange IM messages with each other. IM messages are usually encrypted by using the IM client application. Specifically, referring to FIG. 1, FIG. 1 shows a common enterprise IM architecture using a server of an IM service provider, which may not be owned or operated by the enterprise. An encryption process of the enterprise IM architecture is: after a personal computer (PC) of an employee A receives a message (plaintext) entered by the employee A, an IM client application of the PC performs an encryption process and a packet assembly process on the message, to form an encrypted data packet, that is, ciphertext, and then sends the ciphertext to a network, to send the ciphertext to a PC of an employee B via the network, and may further send the ciphertext to a cloud storage of an IM service provider for storage. In this way, after receiving the ciphertext sent by the PC of the employee A, the PC of the employee B may perform a packet disassembly process and a decryption process on the ciphertext, to obtain a decrypted message, that is, the plaintext, and then presents the decrypted message to the employee B. By means of the IM architecture, when a data packet including messages are sent to a network, an IM client application generally performs encryption, to ensure secure transmission of the messages in the network, prevent the messages from being stolen by an unauthorized person, and ensure IM message security in an enterprise.

SUMMARY

Embodiments of the present disclosure provide a message encryption method and apparatus, and a message decryption method and apparatus, to improve IM message security.

Aspects of the disclosure provide a method of encrypted communication by a terminal device. An encryption request for a message is obtained by processing circuitry of the terminal device. The encryption request includes an identifier of an encryption routine and an encryption key. The encryption routine is identified according to the identifier of the encryption routine included in the encryption request, and an encrypted message is generated by the processing circuitry of the terminal device by encrypting the message using the identified encryption routine and the encryption key included in the encryption request. A data packet is generated by performing a packet assembly process on the encrypted message. The data packet is sent to another device via a network.

In an embodiment, execution of the identified encryption routine is invoked by using an encryption interface to encrypt the message according to the encryption key.

In an embodiment, before the encryption request is obtained, whether a message type of the message is a preset message type requiring encryption is determined, and the encryption request for the message is obtained when the message type of the message is determined as the preset message type requiring encryption.

In an embodiment, before whether the message type of the message is the preset message type requiring encryption is determined, a configuration information obtaining request is sent to a server, and encryption configuration information that is provided by the server in response to the configuration information obtaining request is received. The encryption configuration information includes the identifier of the encryption routine, the encryption key, and the preset message type requiring encryption.

In an embodiment, the configuration information obtaining request includes login information that corresponds to an enterprise. The encryption configuration information is associated with the enterprise.

In an embodiment, the message is received according to a user input via an input interface of the terminal device.

In an embodiment, a search for the encryption routine based on the identifier is invoked by using an encryption interface, and the data packet is generated and set by performing the packet assembly process on the message without encryption when the encryption routine is not found as a result of the search. Moreover, the data packet is generated and sent by performing the packet assembly process on the message encrypted using the encryption routine when the encryption routine is found as the result of the search.

Aspects of the disclosure provide a method of encrypted communication by a terminal device. A data packet from another device is received via a network, an encrypted message from the data packet is obtained by performing a packet disassembly process on the data packet, and a decryption request for the encrypted message is obtained by processing circuitry of the terminal device. The decryption request includes an identifier of a decryption routine and a decryption key. Moreover, the decryption routine is identified according to the identifier of the decryption routine included in the decryption request, and the encrypted message is decrypted by the processing circuitry of the terminal device using the identified decryption routine and the decryption key included in the decryption request.

In an embodiment, execution of the identified decryption routine is invoked by using an encryption interface to decrypt the encrypted message according to the decryption key.

In an embodiment, before the decryption request is obtained, whether a message type of the encrypted message is a preset message type requiring decryption is determined, and the decryption request for the encrypted message is obtained when the message type of the encrypted message is determined as the preset message type requiring decryption.

In an embodiment, before whether the message type of the encrypted message is the preset message type requiring decryption is determined, a configuration information obtaining request is sent to a server, and decryption configuration information that is provided by the server in response to the configuration information obtaining request is received. The decryption configuration information includes the identifier of the decryption routine, the decryption key, and the preset message type requiring decryption.

In an embodiment, the configuration information obtaining request includes login information that corresponds to an enterprise. The encryption configuration information is associated with the enterprise.

In an embodiment, a search for the decryption routine based on the identifier is invoked by using an encryption interface, and the encrypted message is output for display without decryption when the decryption routine is not found as a result of the search. Moreover, the encrypted message is decrypted and output for display using the decryption routine when the decryption routine is found as the result of the search.

Aspects of the disclosure provide a non-transitory computer-readable medium storing instructions which when executed by a computer cause the computer to perform any of the methods of encrypted communication by a terminal device, as described above.

Aspects of the disclosure further provide a terminal device that includes processing circuitry and communication circuitry. The processing circuitry obtains an encryption request for a message, where the encryption request includes an identifier of an encryption routine and an encryption key. The processing circuitry also identifies the encryption routine according to the identifier of the encryption routine included in the encryption request, and generates an encrypted message by encrypting the message using the identified encryption routine and the encryption key included in the encryption request. The communication circuitry generates a data packet by performing a packet assembly process on the encrypted message, and sends the data packet to another device via a network.

In an embodiment, the processing circuitry further invokes, by using an encryption interface, execution of the identified encryption routine to encrypt the message according to the encryption key.

In an embodiment, the processing circuitry further determines, before the processing circuitry obtains the encryption request for the message, whether a message type of the message is a preset message type requiring encryption. The processing circuitry further obtains the encryption request for the message when the processing circuitry determines that the message type of the message is the preset message type requiring encryption.

In an embodiment, the processing circuitry further sends a configuration information obtaining request to a server before the processing circuitry determines whether the message type of the message is the preset message type requiring encryption. The processing circuitry further receives encryption configuration information that is provided by the server in response to the configuration information obtaining request, the encryption configuration information including the identifier of the encryption routine, the encryption key, and the preset message type requiring encryption.

In an embodiment, the configuration information obtaining request includes login information that corresponds to an enterprise. The encryption configuration information is associated with the enterprise.

In an embodiment, the processing circuitry further receives the message according to a user input via an input interface of the terminal device.

In an embodiment, the processing circuitry further invokes, by using an encryption interface, a search for the encryption routine based on the identifier. The processing circuitry further generates and sends the data packet by performing the packet assembly process on the message without encryption when the encryption routine is not found as a result of the search. The processing circuitry further generates and sends the data packet by performing the packet assembly process on the message encrypted using the encryption routine when the encryption routine is found as the result of the search.

Aspects of the disclosure further provide a terminal device that includes communication circuitry and processing circuitry. The communication circuitry receives a data packet from another device via a network and obtains an encrypted message from the data packet by performing a packet disassembly process on the data packet. The processing circuitry obtains a decryption request for the encrypted message, the decryption request including an identifier of a decryption routine and a decryption key, identifies the decryption routine according to the identifier of the decryption routine included in the decryption request, and decrypts the encrypted message using the identified decryption routine and the decryption key included in the decryption request.

In an embodiment, the processing circuitry further invokes, by using an encryption interface, execution of the identified decryption routine to decrypt the encrypted message according to the decryption key.

In an embodiment, the processing circuitry further determines, before the decryption request is obtained, whether a message type of the encrypted message is a preset message type requiring decryption, and obtains the decryption request for the encrypted message when the message type of the encrypted message is determined as the preset message type requiring decryption.

In an embodiment, the processing circuitry further, before determining whether the message type of the encrypted message is the preset message type requiring decryption, sends a configuration information obtaining request to a server, and receives decryption configuration information that is provided by the server in response to the configuration information obtaining request, the decryption configuration information including the identifier of the decryption routine, the decryption key, and the preset message type requiring decryption.

In an embodiment, the configuration information obtaining request includes login information that corresponds to an enterprise. The encryption configuration information is associated with the enterprise.

In an embodiment, the processing circuitry further invokes, by using an encryption interface, a search for the decryption routine based on the identifier. The processing circuitry further outputs the encrypted message for display without decryption when the decryption routine is not found as a result of the search. The processing circuitry further decrypts and outputs the encrypted message for display using the decryption routine when the decryption routine is found as the result of the search.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the technology may still derive other drawings from these accompanying drawings.

DESCRIPTION OF EMBODIMENTS

The technical solutions in the embodiments of the present disclosure are described below with reference to the accompanying drawings in the embodiments of the present disclosure. The embodiments described in the present disclosure are non-limiting embodiments. All other embodiments obtained by a person skilled in the technology based on the embodiments of the present disclosure shall fall within the scope of the present disclosure.

The embodiments of the present disclosure provide an apparatus and method of encrypted communication, such as a message encryption method and apparatus, and a message decryption method and apparatus. Detailed descriptions are provided below.

Embodiment 1

In this embodiment, descriptions are made from the perspective of a message encryption apparatus. The message encryption apparatus may be specifically integrated in a terminal or another device requiring message encryption.

A message encryption method is provided, including: obtaining an encryption request for a message, the encryption request carrying an identifier of an encryption routine and an encryption key;

determining the corresponding encryption program according to the identifier of the encryption routine in the encryption request, and encrypting the message based on the encryption key included in the encryption request, to obtain an encrypted message; and performing a packet assembly process on the encrypted message to obtain a corresponding data packet, and sending the data packet to another device via a network.

Figure 1:
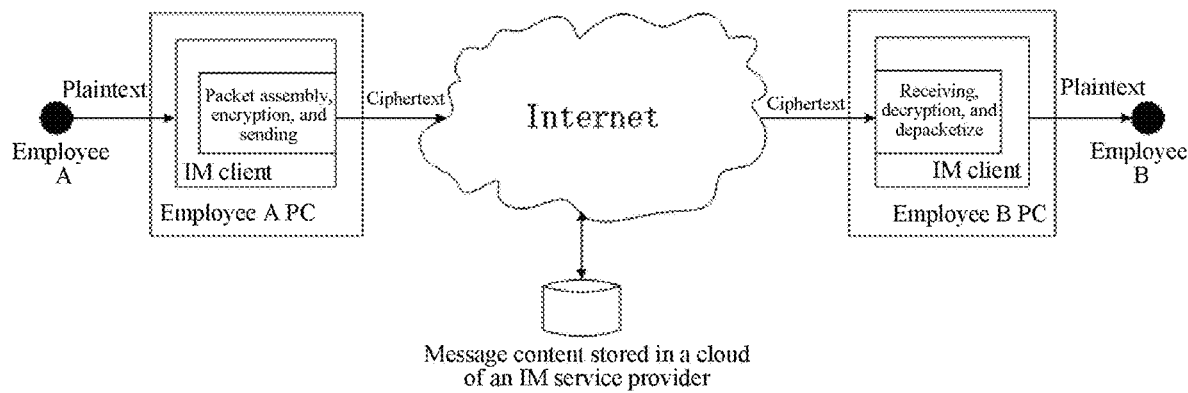
FIG. 1 is a schematic diagram of an enterprise IM architecture.
Figure 2A:
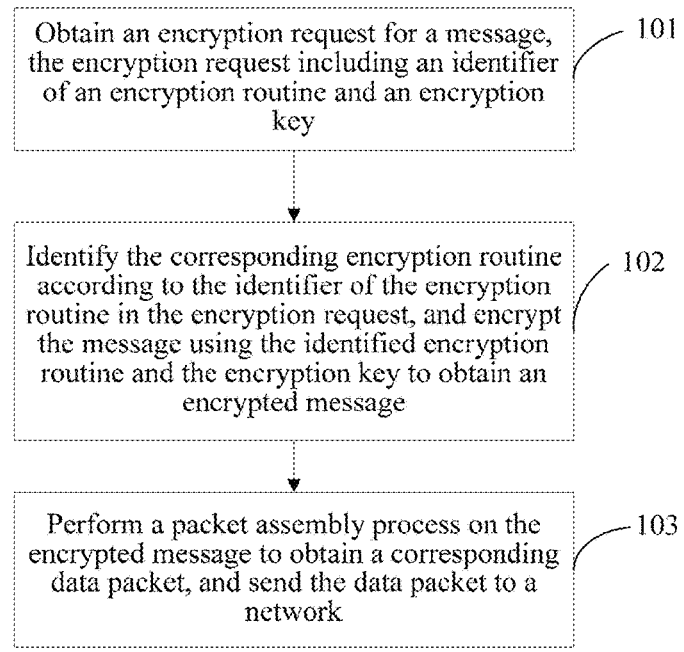
FIG. 2a is a flowchart of a message encryption method according to Embodiment 1 of the present disclosure.

As shown in FIG. 2a, a process of the message encryption method may be specifically as follows:

101: Obtain the encryption request for the message, the encryption request including the identifier of the encryption routine and the encryption key.

For example, after a user logs in to an IM client application, the IM client application receives a message entered by the user, and receives an encryption request for the message. Specifically, the IM client application may extract, from storage, a required identifier of an encryption routine and an encryption key, and then generate the encryption request for the message according to the identifier and the encryption key, where the encryption request carries the identifier and the encryption key.

The identifier of the encryption routine may be a name of the encryption routine. The encryption routine may be an encryption routine, function, or program developed by an enterprise itself, or may be an encryption routine, function, or program developed by a third party trusted by the enterprise. The encryption routine is generated based on a preset encryption algorithm. In this embodiment, before encryption, a specified encryption routine may be installed on a terminal. In certain embodiments, the encryption routine may be a pre-installed library, such as a cryptographic service provider (CSP). The CSP is a component in an operating system, such as a Windows operating system, that is implemented by software and/or hardware and configured to provide a predetermined encryption function. An application program may invoke the CSP to execute an encryption service. In some applications, the enterprise, an individual, or a developer may program a CSP according to a set of predetermined criteria to provide services based on various encryption, decryption, and/or signature algorithms, and the like. In this case, the identifier of the encryption routine may be a name of a CSP.

In this embodiment, the identifier of the encryption routine and the encryption key may be obtained in any of a plurality of manners. For example, encryption configuration information may be obtained before the encryption request for the message is obtained. The encryption configuration information includes the identifier of the encryption routine and the encryption key. That is, before step 101, the method of this embodiment may further include: sending a configuration information obtaining request to a server, and receiving the encryption configuration information that is provided by the server in response to the configuration information obtaining request.

In some applications, an enterprise manager may configure encryption configuration information of message encryption by configuring a management module (for example, a terminal), and store the encryption configuration information in a server, for example, in a cloud server of an IM service provider, so that an encryption terminal can obtain or access the encryption configuration information therefrom. Because the cloud server can store encryption configuration information for a plurality of enterprises, the encryption configuration information may be stored according to an enterprise identifier. In this way, when a terminal affiliated with a particular enterprise requests configuration information from the server, the encryption configuration information that corresponds to the particular enterprise may be delivered to the terminal affiliated with the enterprise according to the enterprise to which an IM login account belongs. For example, after login to an IM client application, the configuration information obtaining request may be sent to the cloud server of the IM service provider, where the request carries an IM login information; and after receiving the request, the cloud server determines an enterprise to which the IM login information belongs, and returns the encryption configuration information corresponding to the enterprise to the IM client application.

In certain embodiments, the encryption configuration information may further include message encryption enable/disable information. The message encryption enable/disable information is used for indicating whether a message is to be encrypted. In this case, before the step of "obtaining an encryption request for a message", the message encryption method may further determine, according to the message encryption enable/disable information, whether a message is to be encrypted, and perform the step of obtaining the encryption request for the message if the message is to be encrypted.

102: Identify the corresponding encryption routine according to the identifier of the encryption routine in the encryption request, and encrypt the message using the identified encryption routine and the encryption key included in the encryption request, to obtain the encrypted message.

Specifically, the encryption routine corresponding to the identifier is invoked, and the message is encrypted by executing the encryption routine using the encryption key. The encryption key is used as a key parameter of an encryption algorithm corresponding to the encryption routine. For example, the IM client invokes a CSP corresponding to an identifier, and causes execution of the CSP to encrypt an IM message using the encryption key.

The encryption routine corresponding to the identifier may be invoked in any of a plurality of manners. For example, the encryption routine corresponding to the identifier may be invoked by using an encryption interface. That is, step 102 may specifically invoke, by using the encryption interface, execution of the encryption routine corresponding to the identifier; and encrypt the message according to the encryption key and the invoked encryption routine.

For example, the CSP may be invoked by using a cryptographic application programming interface (Crypto API). The Crypto API is a security encryption application architecture and service provided by Microsoft, and is supported by many operating systems of the Windows series. The Crypto API provides a set of standard application programming interfaces, and a developer can conveniently expand a security encryption application service of the developer. By using the Crypto API, the developer may add a security service to an application program based on Windows, including: abstract syntax notation one (ASN.1), public key infrastructure (PKI), and/or symmetric cryptographic technology, and the like, for encoding/decoding, data encryption/decryption, identity authentication, and digital certificate management. In addition, the application developer may develop, relatively conveniently and rapidly, a security encryption application that is standard, general-purpose, and easy for expansion.

Figure 2B:
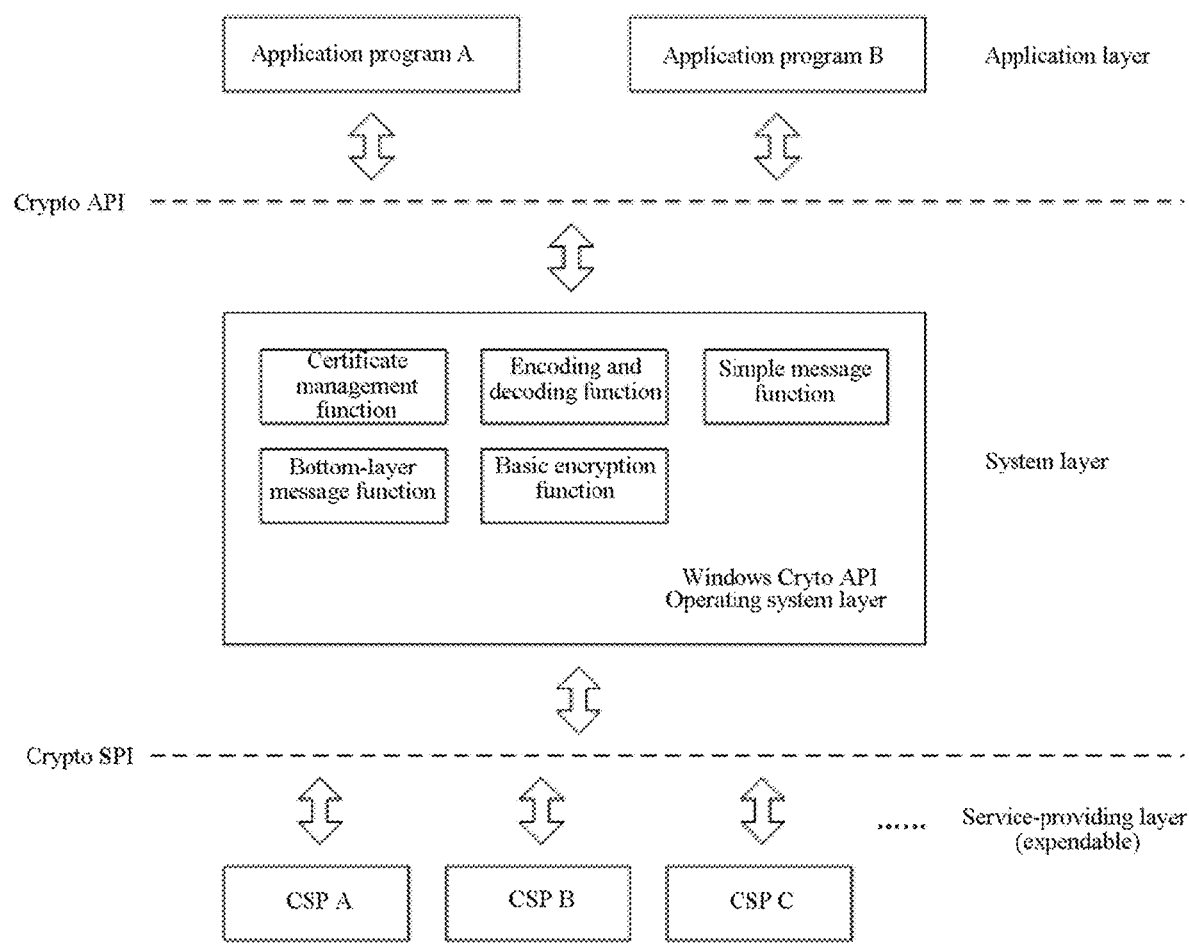
FIG. 2b is a schematic structural diagram of a Crypto API system according to Embodiment 1 of the present disclosure.

Referring to FIG. 2b, which is a structural architecture diagram of a Crypto API system. The Crypto API system includes three layers, including an application layer, a system layer, and a service-providing layer.

An uppermost layer is the application layer, may include application programs developed by enterprises, and corresponds to a user of an encryption service. A middle layer is the operating system layer, provides upward a uniform encryption service API, and separates implementation details of a bottom layer encryption service from the application layer. However, an encryption service is not rendered at the middle layer. A bottom layer is the service providing layer, and includes one or more cryptographic service providers (CSPs). The CSPs are routines, functions, and/or programs performing encryption related processes, such as key generation, data encryption, and/or digital signature based on various algorithms. The CSPs are independent of the application layer and the operating system layer. A third party developer can conveniently develop a CSP routine, function, and/or program of the third party by using a general-purpose programming interface, and then expand the functionalities of a windows system of the third party by expanding the supported functionalities of the service providing layer.

To reduce resource consumption, in this embodiment, before the encryption routine corresponding to the identifier is invoked, first, it may further be determined whether the encryption routine exists, and if it is determined that the encryption routine exists, the encryption routine is invoked by using an encryption interface. After the step of "obtaining an encryption request for a message" and before the step of "invoking, by using an encryption interface, the encryption routine corresponding to the identifier", the method of this embodiment may further include: determining whether the encryption routine corresponding to the identifier exists; and if the encryption routine corresponding to the identifier exists, invoking, by using the encryption interface, execution of the encryption routine corresponding to the identifier.

Specifically, the encryption routine corresponding to the identifier may be searched for by invoking the encryption interface. If the encryption routine corresponding to the identifier is found, it is determined that the encryption routine corresponding to the identifier exists, and the step of invoking, by using the encryption interface, the encryption routine corresponding to the identifier is performed. If the encryption routine corresponding to the identifier is not found, it is determined that the encryption routine corresponding to the identifier does not exist. For example, a CSP corresponding to a CSP name is searched for by invoking a Crypto API; and if the CSP corresponding to the CSP name is found, it is determined that the corresponding CSP exists, and then the CSP is invoked by using the Crypto API; or if the CSP corresponding to the CSP name is not found, it is determined that the corresponding CSP does not exist. In certain embodiments when the encryption routine corresponding to the identifier does not exist, the message may be directly sent, and encryption is not performed.

103: Perform a packet assembly process on the encrypted message to obtain a corresponding data packet, and send the data packet to another device via a network.

For example, the IM client application performs a packet assembly process on the encrypted message, and sends an obtained data packet to another IM client application or a cloud server of an IM service provider via a network.

In certain embodiments, because there is a plurality of message types such as text, picture, file, and audio/video, to reduce resource consumption, some types of messages may be selectively encrypted. That is, before the step of "obtaining an encryption request for a message", the method of this embodiment may further include:

determining whether a message type of the message is a preset message type requiring encryption; and performing the step of obtaining the encryption request for the message if the message type of the message is the preset message type requiring encryption.

The preset message type may be set according to one or more predetermined criteria, for example, may be a picture or text.

Before the message type is determined, in the method of this embodiment, the preset message type requiring encryption may be obtained by various approaches. For example, the preset message type requiring encryption may be obtained from the encryption configuration information. That is, the foregoing encryption configuration information may further include the preset message type requiring encryption. After the encryption configuration information is obtained, it can be determined whether the type of the message is the preset message type requiring encryption.

In certain embodiments, there is a plurality of encryption methods. For example, the encryption method may be symmetric encryption (a same password is used for both encryption and decryption) and asymmetric encryption (different keys are respectively used for encryption and decryption). In consideration of message security and encryption/decryption efficiency, in at least one embodiment, the symmetric encryption is used.

It can be learned from the above that, in this embodiment of the present disclosure, an encryption request for a message is obtained, the encryption request including an identifier of an encryption routine and an encryption key; then, the message is encrypted according to the encryption routine corresponding to the identifier and the encryption key, to obtain an encrypted message; and a packet assembly process is performed on the encrypted message to obtain a corresponding data packet, and the data packet is sent to another device via a network. By means of this solution, a message may be encrypted according to a specified encryption routine and encryption key before the message is sent to a network, thereby avoiding that the message is encrypted by using an IM client application provided by an IM service provider. By means of this solution, an IM message can be viewed only on a particular terminal (on which a specified decryption routine and decryption key are installed). For example, an IM message in an enterprise can be controlled to be viewed only on a terminal on which an encryption/decryption routine and a key that are specified by the enterprise are installed, and cannot be viewed on a terminal on which the encryption/decryption routine and the key that are specified by the enterprise are not installed. Because an unauthorized person cannot obtain the specified encryption/decryption routine and key, even if login information on the IM client application is stolen by the unauthorized person, the unauthorized person still cannot view the IM message after logging in to the IM client application on another terminal by using the stolen login information. Therefore, compared with the existing technology, this solution improves IM message security, and particularly for an enterprise, can greatly improve IM message security in the enterprise.

In addition, in this embodiment, an encryption routine may be designed by an enterprise itself, thereby improving encryption flexibility. Moreover, the encryption routine can be arranged as not accessible to an IM service provider. Therefore, the IM service provider cannot learn specific implementation of an encryption algorithm adopted by the proprietary encryption routine. Even if encrypted message content is stored in a cloud of the IM service provider, the IM service provider cannot view actual content by means of decryption, thereby further improving IM message security.

Embodiment 2

According to the method described in Embodiment 1, detailed descriptions are further made below by using an example.

In this embodiment, descriptions are made by using that the message encryption apparatus is specifically integrated in a terminal and the encryption program is a CSP as an example.

The message encryption apparatus may be implemented in a form of a client application or other software to be installed on a terminal, such as an IM client application that can be installed on the terminal.

Figure 3:
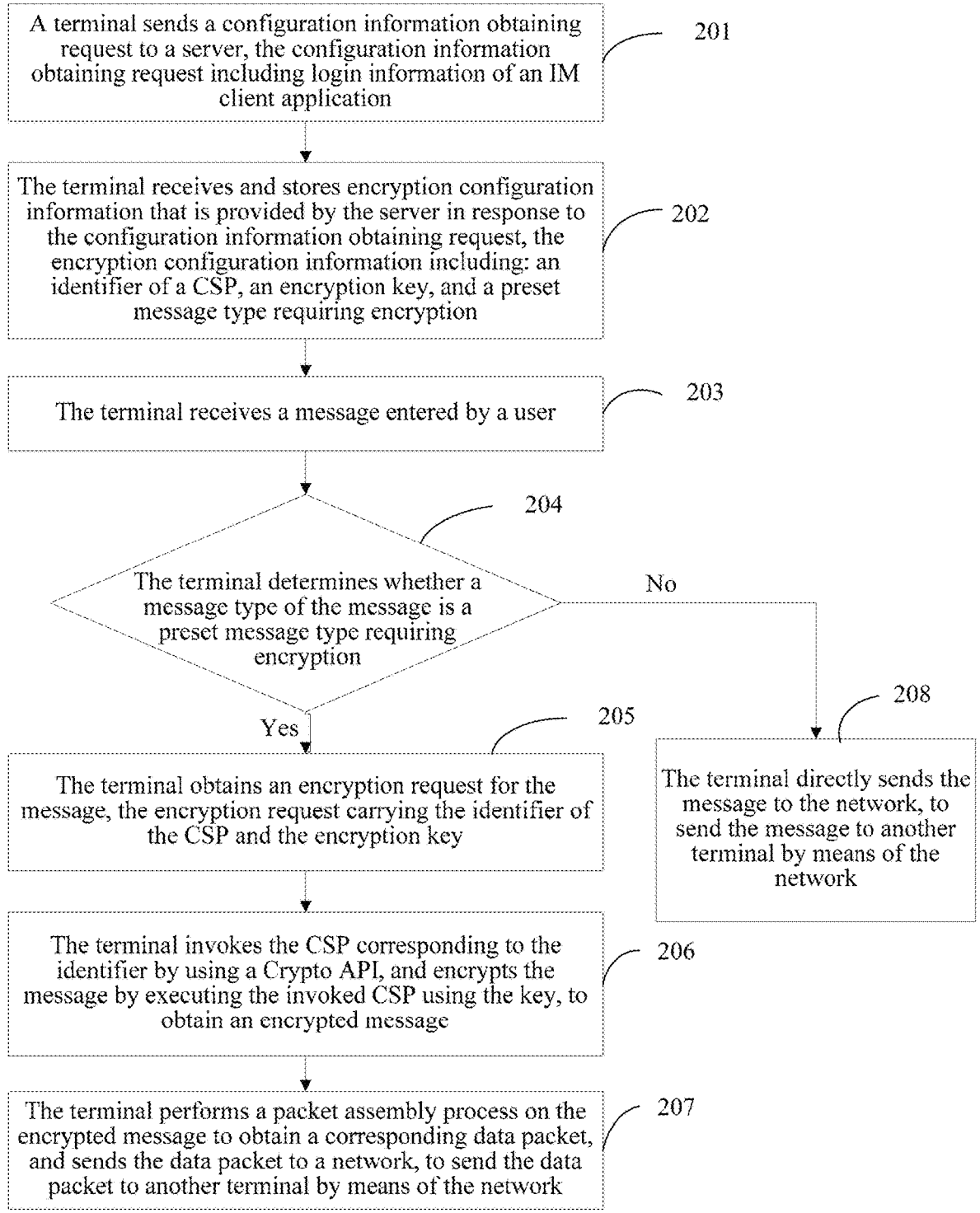
FIG. 3 is a flowchart of a message encryption method according to Embodiment 2 of the present disclosure.

As shown in FIG. 3, a specific process of the message encryption method may be as follows:

201: The terminal sends a configuration information obtaining request to a server, the configuration information obtaining request including login information of the IM client application.

For example, after login to the IM client application on the terminal, the configuration information obtaining request is sent to a cloud server of an IM service provider, the request including the login information of the IM client application.

202: The terminal receives and stores encryption configuration information that is provided by the server in response to the configuration information obtaining request, the encryption configuration information includes an identifier of the CSP, an encryption key, and a preset message type requiring encryption.

For example, the IM client application locally buffers the encryption configuration information provided by the server, for subsequent use. After receiving the configuration information obtaining request, the server determines an enterprise to which the login information belongs, and then sends encryption configuration information corresponding to the enterprise to the IM client application.

In some applications, if failing to obtain the encryption configuration information, the IM client application may send the configuration information obtaining request again to the server after a preset interval.

The encryption configuration information may be configured by using a configuration management module. For example, the configuration management module generates the encryption configuration information according to configuration information entered by a user, and then sends a configuration request to the server. In certain embodiments, the configuration request includes the encryption configuration information, so that the server stores the encryption configuration information in a corresponding position according to the configuration request. Still further, the server may further notify the terminal of a configuration update.

In this embodiment, the configuration management module is provided mainly for an enterprise manager, is a control center of an entire encryption system, and includes information not generally accessible to an ordinary employee. The manager may set content related to encryption by using the configuration management module. After an employee logs into an IM client application, the IM client application can retrieve for the employee configuration information of the enterprise to which the employee belongs, and processes a message according to configuration when receiving and sending the message.

203: The terminal receives a message entered by a user.

For example, the terminal receives a message that is entered by the user by using an input interface provided by the IM client application. The input interface may be an input box, a button, and the like.

204: The terminal determines whether a message type of the message is a preset message type requiring encryption; and step 205 is performed if the message type of the message is the preset message type requiring encryption; or step 208 is performed if the message type of the message is not the preset message type requiring encryption.

Specifically, the terminal first determines the message type of the message, and then determines whether the message type is the preset message type. For example, the message type of the message is determined as a picture, text, or the like, and the preset message type may be a picture, text, a video, or the like.

In some applications, before the message type is determined, it may further be determined whether message encryption function is enabled. That is, between steps 203 and 204, the method may further include: determining whether message encryption function is enabled; and performing step 204 if message encryption is function enabled. For example, the terminal may determine whether a message encryption function is enabled.

Specifically, the encryption configuration information may further include encryption enable/disable information. It may be determined whether message encryption function is enabled according to the encryption enable/disable information. The encryption enable/disable information indicates whether message encryption function is enabled.

205: The terminal obtains an encryption request for the message, the encryption request including the identifier of the CSP and the encryption key.

For example, the IM client application extracts the identifier of the CSP and the key from local storage, and generates the encryption request according to the identifier of the CSP and the key.

206: The terminal invokes the CSP corresponding to the identifier by using a Crypto API, and encrypts the message by executing the invoked CSP using the key, to obtain an encrypted message.

For example, the IM client application invokes the CSP corresponding to the identifier by using the Crypto API, and encrypts an IM message according to the key and the invoked CSP. Specifically, the IM client application invokes the CSP corresponding to a name of the CSP by using the Crypto API, and then executes the CSP to encrypt the message by using the key as a key parameter of the CSP.

In some applications, to reduce resource consumption, before steps 205 and 206, the method may further include: invoking, by the terminal, the Crypto API to search for the CSP corresponding to the identifier; and performing step 206 if the CSP corresponding to the identifier is found; or directly sending the message without encryption if the CSP corresponding to the identifier is not found.

207: The terminal performs a packet assembly process on the encrypted message to obtain a corresponding data packet, and sends the data packet to another device, such as a terminal or a cloud server, via a network.

For example, after generating the data packet, the IM client application sends the data packet to a network, to send the data packet to another IM client application or a cloud server of an IM service provider by means of the network.

208: The terminal directly sends the message to the network without encryption, to send the message to another terminal by means of the network.

In certain embodiments, various encryption methods may be applicable for encrypting the message. For example, the encryption method may be symmetric encryption (a same password is used for both encryption and decryption) or asymmetric encryption (different keys are respectively used for encryption and decryption). In consideration of message security and encryption/decryption efficiency, in at least one embodiment, the symmetric encryption is used.

It can be learned from the above that, in this embodiment of the present disclosure, the terminal sends a configuration information obtaining request to the server; receives and saves encryption configuration information returned by the server; then, obtains an encryption request for a message, the encryption request includes an identifier of an encryption routine and an encryption key; encrypts the message according to the encryption routine corresponding to the identifier and the encryption key, to obtain an encrypted message; and performs a packet assembly process on the encrypted message to obtain a corresponding data packet, and then sends the data packet to a network. By means of this solution, a message may be encrypted according to a specified encryption/decryption routine, function, or program and key before the message is sent to a network, thereby avoiding that the message is encrypted by using an IM client application provided by an IM service provider. By means of this solution, an IM message can be viewed only on a terminal on which an encryption/decryption routine, function, or program and key are installed. Because an unauthorized person cannot obtain a specified encryption routine and key, even if login information on the IM client application is stolen by the unauthorized person, the unauthorized person still cannot view the IM message after logging into the IM client application on another terminal by using the stolen login information. Therefore, compared with the existing technology, this solution improves IM message security. For example, in this solution, an IM message in an enterprise can be controlled to be viewed only on a terminal on which an encryption/decryption routine and a key that are specified by the enterprise are installed, and cannot be viewed on a terminal on which the encryption/decryption routine and the key that are specified by the enterprise are not installed. For an enterprise, this solution greatly improves IM message security.

In addition, the method of this embodiment combines the Crypto API architecture of Microsoft and the CSP technology, so that IM message content of an enterprise can be encrypted by using an encryption routine (e.g., a CSP) that is developed by the enterprise and that is defined by the enterprise, and an IM service provider cannot access an IM message, thereby improving encryption flexibility, and also preventing a message from being stolen by the IM service provider.

Embodiment 3

In this embodiment, descriptions are made from the perspective of a message decryption apparatus. The message decryption apparatus may be specifically integrated in a terminal or another device requiring message decryption.

A message decryption method is provided, including: obtaining a data packet from another device via a network, and performing a packet disassembly process on the data packet, to obtain an encrypted message; obtaining a decryption request for the encrypted message, the decryption request including at least an identifier of a decryption routine and a decryption key; and identifying the corresponding decryption routine according to the identifier of the decryption program in the decryption request, and decrypting the encrypted message using the identified decryption routine and the decryption key, to obtain a decrypted message.

Figure 4:
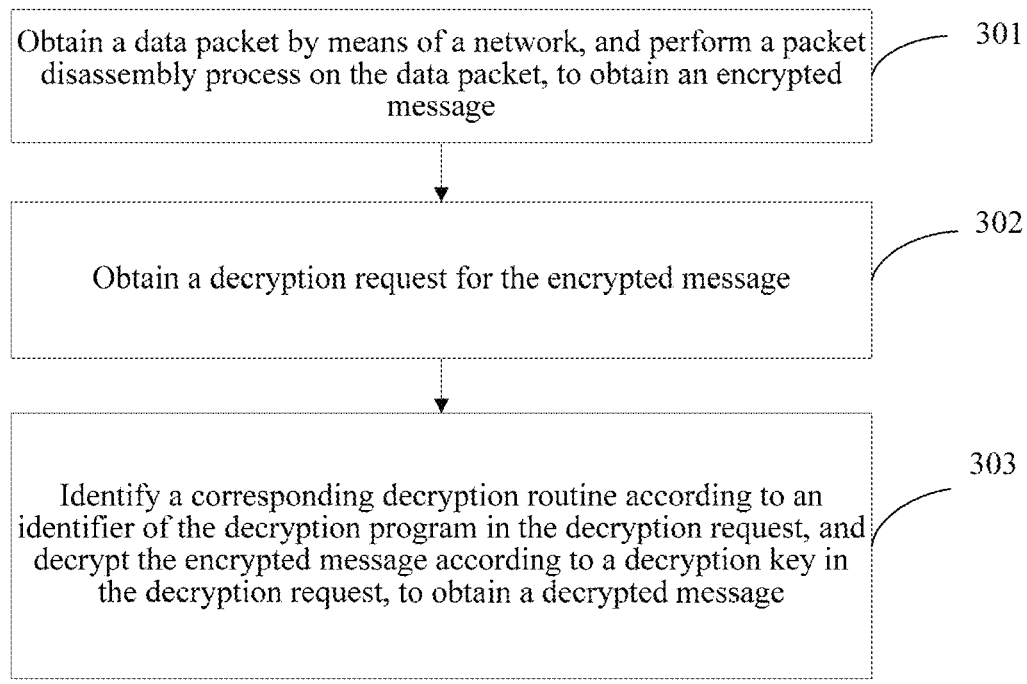
FIG. 4 is a flowchart of a message decryption method according to Embodiment 3 of the present disclosure.

As shown in FIG. 4, a process of the message decryption method may be specifically as follows:

301: Obtain the data packet by means of the network, and perform a packet disassembly process on the data packet, to obtain the encrypted message.

For example, after login to an IM client application, a data packet is obtained by means of a WiFi network, and then a packet disassembly process is performed on the data packet, to obtain an encrypted message.

302: Obtain the decryption request for the encrypted message, the decryption request including at least the identifier of the decryption routine and the decryption key.

The identifier of the decryption routine may be a name of the decryption routine, function, or program. The decryption routine may be a decryption routine, function, or program developed by an enterprise itself, or may be a decryption routine, function, or program developed by a third party trusted by the enterprise. The decryption routine is generated based on a preset decryption algorithm. In this embodiment, before message decryption, a specified decryption routine may be installed on a decryption terminal. In actual application, the decryption program may be a pre-installed library, such as a cryptographic service provider (CSP). In this case, the identifier of the decryption routine may be a name of the CSP.

For example, when a CSP having an encryption/decryption function is installed on the terminal, and a message requires encryption/decryption, the message is encrypted or decrypted by invoking the CSP. That is, one CSP can be shared in encryption and decryption on the message.

In this embodiment, the decryption key may be used as a parameter of the decryption routine, to decrypt the encrypted message. When a symmetric encryption solution is used, the decryption key is the same as the corresponding encryption key. In this case, message encryption/decryption efficiency can be improved.

Specifically, the decryption request for the encrypted message may be obtained in any of a plurality of manners. For example, the identifier of the decryption routine and the decryption key may be obtained, and then the decryption request for the encrypted message is generated according to the identifier and the key, the request including the identifier and the key.

The identifier of the decryption routine and the decryption key may be obtained in any of a plurality of manners. For example, decryption configuration information may be obtained before the decryption request is obtained. The decryption configuration information includes the identifier of the decryption routine and the decryption key. That is, before step 302, the method of this embodiment may further include: sending a configuration information obtaining request to a server, and receiving the decryption configuration information that is returned by the server according to the configuration information obtaining request. The decryption configuration information includes the identifier of the decryption routine and the decryption key.

In some applications, an enterprise manager may configure decryption configuration information for message decryption by using a configuration management module (for example, a terminal), and stores the decryption configuration information in the server, for example, in a cloud server of an IM service provider, so that a decryption terminal obtains or retrieves the decryption configuration information. When the encryption configuration information is the same as the decryption configuration information, the manager only needs to configure one piece of configuration information. The cloud server may store decryption configuration information of a plurality of enterprises, and therefore, may store the decryption configuration information according to identifiers of the enterprises. In this way, when a terminal in the enterprises requests configuration information from the server, the server may deliver corresponding decryption configuration information according to an enterprise to which IM login information belongs to the terminal in the enterprises. For example, after logging into an IM client application, the configuration information obtaining request may be sent to the cloud server of the IM service provider, the request includes IM login information; and after receiving the request, the cloud server determines an enterprise to which the IM login information belongs, and returns the decryption configuration information corresponding to the enterprise to the IM client application.

In certain embodiments, when encryption or decryption is performed by using the symmetric encryption solution and an encryption/decryption routine (for example, a CSP), the decryption configuration information may be the same as the foregoing encryption configuration information. That is, the encryption routine is the same as the decryption routine, and the encryption key is the same as the decryption key. In some applications, a piece of encryption/decryption configuration information may be configured as the decryption configuration information or the encryption configuration information. In this way, in a process of encrypting/decrypting a message, only the encryption/decryption configuration information needs to be obtained, thereby improving message encryption/decryption efficiency.

Similarly, the decryption configuration information in this embodiment may further include message decryption enable/disable information. The message decryption enable/disable information is used for indicating whether a message is to be decrypted. In this case, between steps 301 and 302, the method may further include: determining, according to the message decryption enable/disable information, whether the encrypted message is to be decrypted; and performing the step of obtaining the decryption request for the encrypted message if the encrypted message is to be decrypted. In some applications, if encrypting a message, a terminal in a same communications system generally needs to decrypt an encrypted message. That is, the encryption process and the decryption process are symmetric. For example, in an IM system, an IM client application needs to encrypt a message, and also needs to decrypt an encrypted message, so as to complete IM message exchange. Therefore, it may be determined whether an incoming message is to be decrypted by determining whether an outgoing message of the same or similar type is to be decrypted. In this case, the message decryption enable/disable information is the foregoing message encryption enable/disable information. That is, the step of "determining whether the encrypted message requires decryption according to the message decryption enable/disable information" may specifically include: determining whether a message requires encryption according to the message encryption enable/disable information; and determining that the encrypted message is to be decrypted if the message of the same or similar type is to be decrypted; or determining that the encrypted message is not to be decrypted if the message of the same or similar type is not to be decrypted.

303: Identify the corresponding decryption routine according to the identifier of the decryption routine in the decryption request, and decrypt the encrypted message according to the decryption key, to obtain a decrypted message.

Specifically, the decryption routine corresponding to the identifier is invoked, and the encrypted message is decrypted according to the key and the invoked decryption program. The key is used as a key parameter of a decryption algorithm corresponding to the decryption routine.

For example, a CSP corresponding to the identifier is invoked, and the encrypted message is decrypted according to the key and the invoked CSP. For another example, the IM client application invokes a CSP corresponding to the identifier, and enables the CSP to decrypt an IM message by using the key.

The decryption routine corresponding to the identifier may be invoked in any of a plurality of manners. For example, the decryption program corresponding to the identifier may be invoked by using an encryption interface. That is, step 303 may specifically include: invoking, by using the encryption interface, execution of the decryption routine corresponding to the identifier; and decrypting the encrypted message according to the key and the invoked decryption routine. For example, a CSP may be invoked by using a cryptographic application programming interface (Crypto API), to decrypt the encrypted message, and the like. In this embodiment, the decryption routine and the encryption routine may be invoked by using a same encryption interface, to reduce resource consumption. For example, when the decryption routine and the encryption routine are a same CSP, the CSP may be invoked, by using the Crypto API, to perform encryption or decryption.

To reduce resource consumption, in this embodiment, before the decryption routine corresponding to the identifier is invoked, first, it may further be determined whether the decryption routine exists, and if it is determined that the decryption routine exists, the decryption routine is invoked by using an encryption interface. After the step of "obtaining an encryption request for a message" and before the step of "invoking, by using an encryption interface, the decryption routine corresponding to the identifier", the method of this embodiment may further include: determining whether the decryption routine corresponding to the identifier exists; and if the decryption routine corresponding to the identifier exists, invoking, by using the encryption interface, the decryption routine corresponding to the identifier.

Specifically, the encryption routine corresponding to the identifier may be searched for by invoking the encryption interface. If the encryption routine corresponding to the identifier is found, it is determined that the decryption routine corresponding to the identifier exists, and the step of invoking, by using the encryption interface, the decryption routine corresponding to the identifier is performed; or if the decryption routine corresponding to the identifier is not found, it is determined that the decryption program corresponding to the identifier does not exist. For example, a CSP corresponding to a CSP name is searched for by invoking a Crypto API; and if the CSP corresponding to the CSP name is found, it is determined the corresponding CSP exists, and then the CSP is invoked by using the Crypto API; or if the CSP corresponding to the CSP name is not found, it is determined that the corresponding CSP does not exist.

In certain embodiments, because there is a plurality of message types such as text, picture, file, and audio/video, to reduce resource consumption, in the method of this embodiment, some types of encrypted messages may be selectively decrypted. That is, before the step of "obtaining a decryption request for a message", the method of this embodiment may further include:

determining whether a message type of the encrypted message is a preset message type requiring decryption; and performing the step of obtaining the decryption request for the encrypted message if the message type of the encrypted message is the preset message type requiring decryption.

In some applications, the step of determining the message type may be performed after determining that the message requires decryption.

The preset message type requiring decryption may be set according to one or more predetermined criteria. Generally, the preset message type requiring decryption is the same as the preset message type requiring encryption, for example, may be a picture, text, and the like.

Before the message type is determined, in the method of this embodiment, the preset message type requiring decryption further needs to be obtained, or when a type of an encrypted message is the same as that of a decrypted message, the preset message type requiring encryption is obtained. There is a plurality of obtaining manners. For example, the preset message type requiring encryption may be obtained from decryption configuration information. That is, the foregoing decryption configuration information may further include the preset message type requiring decryption (or include the preset message type requiring encryption when the type of the encrypted message is the same as that of the decrypted message). In this case, the decryption configuration information may include: the identifier of the decryption routine, the decryption key, the message decryption enable/disable information, and the preset message type requiring decryption. For example, when the decryption configuration information is the same as the encryption configuration information, the encryption/decryption configuration information may include: the identifier (such as a name of a CSP) of the encryption/decryption routine, the key for encryption/decryption, the message encryption enable/disable information, the preset message type requiring encryption/decryption, and the like.

It can be learned from the above that, in this embodiment of the present disclosure, a data packet is obtained by means of a network, and a packet disassembly process is performed on the data packet, to obtain an encrypted message; then, a decryption request for the encrypted message is obtained, the decryption request including an identifier of a decryption routine and a decryption key; and the encrypted message is decrypted according to the decryption routine corresponding to the identifier and the decryption key, to obtain a decrypted message. By means of this solution, the encrypted message may be decrypted according to a specified decryption routine and key, thereby avoiding that the message is decrypted by using an IM client application provided by an IM service provider. By means of this solution, an IM message can be viewed only on a particular terminal on which a specified decryption routine and key are installed. Because an unauthorized person cannot obtain the specified decryption routine and key, even if login information on the IM client application is stolen by the unauthorized person, the unauthorized person still cannot view the IM message after logging into the IM client application on another terminal by using the stolen login information. Therefore, compared with the existing technology, this solution improves IM message security. For example, in this solution, an IM message in an enterprise can be controlled to be viewed only on a terminal on which an encryption/decryption routine, function, or program and a key that are specified by the enterprise are installed, and cannot be viewed on a terminal on which the encryption/decryption routine, function, or program and the key that are specified by the enterprise are not installed. For an enterprise, this solution greatly improves IM message security.

In addition, in this embodiment, an encryption routine may be designed by an enterprise itself, thereby improving encryption flexibility. Moreover, the encryption routine may not be accessible to an IM service provider. Therefore, the IM service provider cannot learn specific implementation of an encryption algorithm adopted by the proprietary decryption routine. Even if encrypted message content is stored in a cloud of the service provider, the service provider cannot view actual content by means of decryption, thereby further improving IM message security.

Embodiment 4

According to the method described in Embodiment 3, detailed descriptions are further made below by using an example.

In this embodiment, descriptions are made by using that the message decryption apparatus is specifically integrated in a terminal and the decryption program is a CSP as an example.

The message decryption apparatus may be implemented in a form of a client application or other software to be installed on a terminal, such as an IM client application that can be installed on the terminal.

Figure 5:
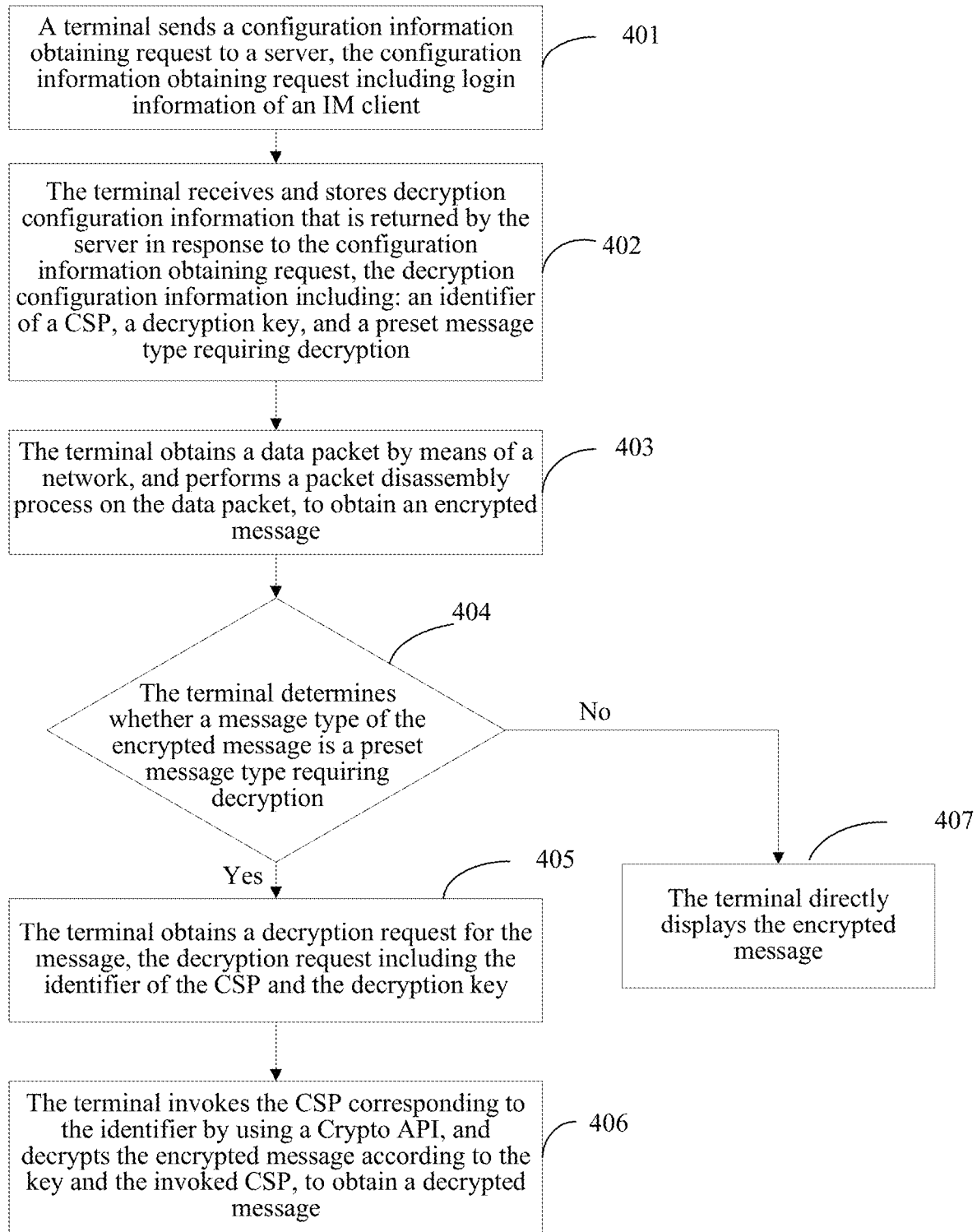
FIG. 5 is a flowchart of a message decryption method according to Embodiment 4 of the present disclosure.

As shown in FIG. 5, a specific process of the message decryption method may be as follows:

401: The terminal sends a configuration information obtaining request to a server, the configuration information obtaining request including login information of the IM client application.

402: The terminal receives and stores decryption configuration information that is returned by the server in response to the configuration information obtaining request, the decryption configuration information including: an identifier of the CSP, a decryption key, and a preset message type requiring decryption.

For example, the IM client locally buffers the decryption configuration information returned by the server, for subsequent use. After receiving the configuration information obtaining request, the server determines an enterprise to which the login information belongs, and then returns decryption configuration information corresponding to the enterprise to the IM client application.

When a symmetric encryption solution is used, the key for decryption is also the key for encryption, and the preset message type requiring decryption may be a preset message type requiring encryption. When encryption or decryption is performed by using a same CSP, an identifier of a CSP for decryption is the same as that of a CSP for encryption.

In some applications, if failing to obtain the decryption configuration information, the IM client application may send the configuration information obtaining request again to the server after a preset interval.

The decryption configuration information may be configured by using a configuration management module. For example, the configuration management module generates the decryption configuration information according to configuration information entered by a user, and then sends a configuration request to the server, the configuration request includes the decryption configuration information, so that the server stores the decryption configuration information in a corresponding position according to the configuration request. Still further, the server may further notify the terminal of a configuration update. In symmetric encryption, when encryption and decryption are performed by using a same CSP, only decryption configuration information or encryption configuration information needs to be configured.

In this embodiment, the configuration management module is provided mainly for an enterprise manager, is a control center of an entire encryption system, and includes information not generally accessible to an ordinary employee. The manager may set content related to encryption by using the configuration management module. After an employee logging into an IM client application, the IM client application can retrieve for the employee configuration information of the enterprise to which the employee belongs, and processes a message according to the retrieved configuration information when receiving and sending the message.

403: The terminal obtains a data packet by means of a network, and performs a packet disassembly process on the data packet, to obtain an encrypted message.

For example, the terminal may obtain, by means of the network, a data packet sent by another terminal, or may obtain a data packet by means of the network from a storage server, for example, obtain a data packet from a cloud server of an IM service provider.

404: The terminal determines whether a message type of the encrypted message is a preset message type requiring decryption; and performs step 405 if the message type of the encrypted message is the preset message type requiring decryption; or performs step 407 if the message type of the encrypted message is not the preset message type requiring decryption.

405: The terminal obtains a decryption request for the message, the decryption request including the identifier of the CSP and the decryption key.

For example, the IM client extracts the identifier of the CSP and the key from locally stored decryption configuration information, and generates the decryption request according to the identifier of the CSP and the key.

406: The terminal invokes the CSP corresponding to the identifier by using a Crypto API, and decrypts the encrypted message according to the key and the invoked CSP, to obtain a decrypted message.

For example, the IM client invokes the CSP corresponding to the identifier by using the Crypto API, and decrypts an IM message according to the key and the invoked CSP. Specifically, the IM client invokes the CSP corresponding to a name of the CSP by using the Crypto API, and then enables the CSP to decrypt the message by using the key as a key parameter of the CSP.

In some applications, to reduce resource consumption, before steps 405 and 406, the method may further include: invoking, by the terminal, the Crypto API to search for the CSP corresponding to the identifier; and performing step 406 if the CSP corresponding to the identifier is found; or directly displaying the message if the CSP corresponding to the identifier is not found.

407: The terminal directly displays the encrypted message.

For example, when the message type of the encrypted message does not belong to the preset message type, or the CSP corresponding to the identifier cannot be found, the terminal does not decrypt the encrypted message, and may directly display the encrypted message. Certainly, because decryption is not performed, a garbled message or the like may be displayed in such scenario.

It can be learned from the above that, in this embodiment of the present disclosure, the terminal obtains a data packet by means of a network, and performs a packet disassembly process on the data packet, to obtain an encrypted message; then, obtains a decryption request for the encrypted message, the decryption request including an identifier of a decryption routine and a decryption key; and decrypts the encrypted message according to the decryption routine corresponding to the identifier and the decryption key, to obtain a decrypted message. By means of this solution, the encrypted message may be decrypted according to a specified decryption routine and key, thereby avoiding that the message is decrypted by using an IM client application provided by an IM service provider. By means of this solution, an IM message can be viewed only on a particular terminal on which a specified decryption routine and key are installed. Because an unauthorized person cannot obtain a specified decryption routine and key, even if login information on the IM client is stolen by the unauthorized person, the unauthorized person still cannot view the IM message after logging into the IM client application on another terminal by using the stolen login information. Therefore, compared with the existing technology, this solution improves IM message security. For example, in this solution, an IM message in an enterprise can be controlled to be viewed only on a terminal on which an encryption/decryption routine, function, or program and a key that are specified by the enterprise are installed, and cannot be viewed on a terminal on which the encryption/decryption routine, function, or program and the key that are specified by the enterprise are not installed. For an enterprise, this solution greatly improves IM message security.

Embodiment 5

Figure 6A:
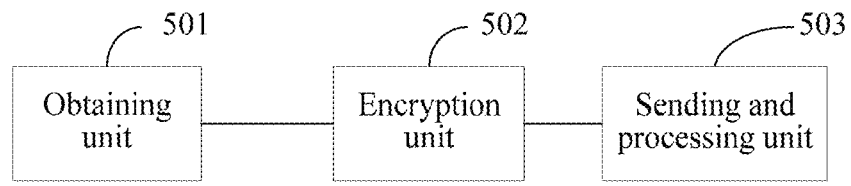
FIG. 6a is a schematic structural diagram of a message encryption apparatus according to Embodiment 5 of the present disclosure.

To implement the foregoing method better, this embodiment of the present disclosure further provides a message encryption apparatus. As shown in FIG. 6a, the message encryption apparatus may include an obtaining unit 501, an encryption unit 502, and a sending and processing unit 503, as follows:

(1) Obtaining Unit 501:

The obtaining unit 501 is configured to obtain an encryption request for a message, the encryption request including an identifier of an encryption routine and an encryption key.

(2) Encryption Unit 502:

The encryption unit 502 is configured to: identify the corresponding encryption routine according to the identifier of the encryption program in the encryption request, and encrypt the message based on the key included in the encryption request, to obtain an encrypted message.

Specifically, the encryption unit 502 may include an invocation subunit and an encryption subunit.

The invocation subunit is configured to invoke, by using an encryption interface, execution of the encryption routine corresponding to the identifier.

The encryption subunit is configured to encrypt the message according to the key and the invoked encryption routine.

The identifier of the encryption routine may be a name of the encryption routine. The encryption routine may be an encryption routine developed by an enterprise itself, or may be an encryption routine developed by a third party trusted by the enterprise. The encryption routine is generated based on a preset encryption algorithm. In this embodiment, before encryption, a specified encryption routine may be installed on a terminal. In certain embodiments, the encryption routine may be a pre-installed library, such as a cryptographic service provider (CSP). The CSP is a component in an operating system, such as a Windows operating system, that is implemented by software and/or hardware and configured to provide a predetermined encryption function. An application program may invoke the CSP to execute an encryption service. In some applications, the enterprise, an individual, or a developer may program a CSP according to a set of predetermined criteria to provide services based on various encryption, decryption, and/or signature algorithms, and the like. In this case, the identifier of the encryption routine may be a name of a CSP.

(3) Sending and Processing Unit 503:

The sending and processing unit 503 is configured to: perform a packet assembly process on the encrypted message to obtain a corresponding data packet, and send the data packet to a network.

Figure 6B:
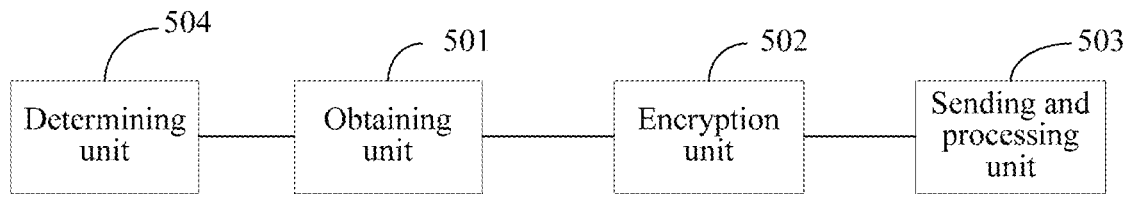
FIG. 6b is a schematic structural diagram of another message encryption apparatus according to Embodiment 5 of the present disclosure.

In certain embodiments, referring to FIG. 6b, the message encryption apparatus provided in this embodiment may further include a determining unit 504.

The determining unit 504 is configured to determine, before the obtaining unit 501 obtains the encryption request for the message, whether a message type of the message is a preset message type requiring encryption.

In this case, the obtaining unit 501 is specifically configured to obtain the encryption request for the message when the determining unit determines that the message type of the message is the preset message type requiring encryption.

Figure 6C:
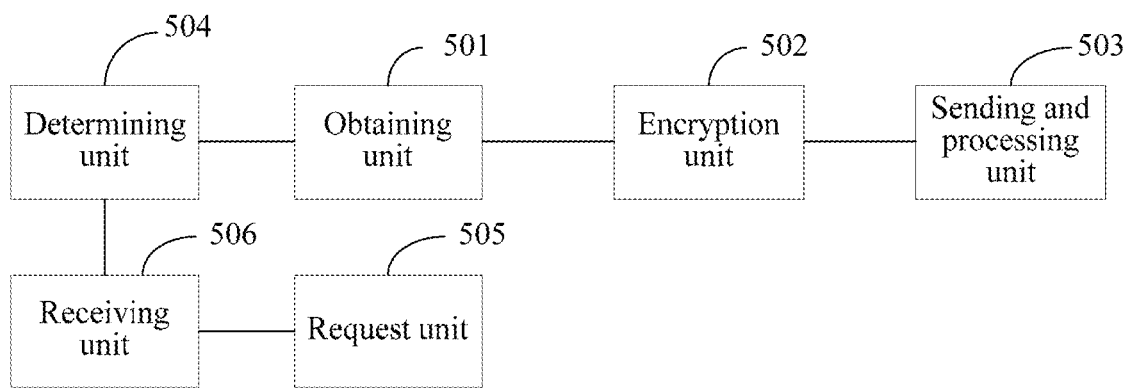
FIG. 6c is a schematic structural diagram of still another message encryption apparatus according to Embodiment 5 of the present disclosure.

Optionally, referring to FIG. 6c, the message encryption apparatus provided in this embodiment may further include a request unit 505 and a receiving unit 506.

The request unit 505 is configured to send a configuration information obtaining request to a server before the determining unit 504 determines whether the message type of the message is the preset message type requiring encryption.

The receiving unit 506 is configured to receive encryption configuration information that is provided by the server in response to the configuration information obtaining request, the encryption configuration information including: the identifier of the encryption routine, the encryption key, and the preset message type requiring encryption.

In some implementations, the foregoing units may be implemented as individual hardware components, or may be combined arbitrarily, or may be implemented as a same hardware component or several hardware components. For various implementations of the foregoing units, refer to the foregoing method embodiments. Details are not described herein again.

The message encryption apparatus may be integrated in a device such as a terminal, for example, may be installed on the terminal in a form of a client application, software, or the like. The terminal may be a device such as a mobile phone, a tablet computer, or a PC.

It can be learned from the above that, in the message encryption apparatus in this embodiment, an encryption request for a message is obtained by using the obtaining unit 501, the encryption request including an identifier of an encryption routine and an encryption key; then, the message is encrypted by using the encryption unit 502 and according to the encryption routine corresponding to the identifier and the key, to obtain an encrypted message; and a packet assembly process is performed by using the sending and processing unit 503 on the encrypted message to obtain a corresponding data packet, and the data packet is sent to a network. By means of this solution, a message may be encrypted according to a specified encryption/decryption routine and key before the message is sent to a network, thereby avoiding that the message is encrypted by using an IM client application provided by an IM service provider. By means of this solution, an IM message can be viewed only on a particular terminal. Because an unauthorized person cannot obtain a specified encryption routine and key, even if login information on the IM client application is stolen by the unauthorized person, the unauthorized person still cannot view the IM message after logging into the IM client application on another terminal by using the stolen login information. Therefore, compared with the existing technology, this solution improves IM message security. For example, in this solution, an IM message in an enterprise can be controlled to be viewed only on a terminal on which an encryption/decryption routine and a key that are specified by the enterprise are installed, and cannot be viewed on a terminal on which the encryption/decryption routine and the key that are specified by the enterprise are not installed. For an enterprise, this solution greatly improves IM message security.

In addition, in this embodiment, an encryption routine may be designed by an enterprise itself, thereby improving encryption flexibility. Moreover, the encryption routine is not accessible to an IM service provider. Therefore, the IM service provider cannot learn specific implementation of an encryption algorithm. Even if encrypted message content is stored in a cloud of the service provider, the service provider cannot view actual content by means of decryption, thereby further improving IM message security.

Embodiment 6

Figure 7:
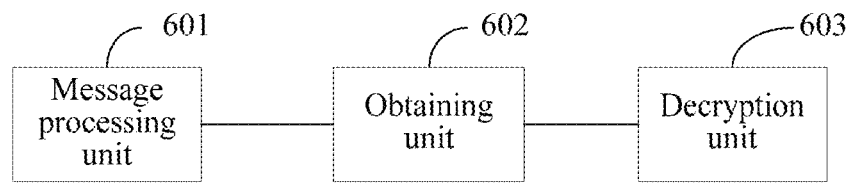
FIG. 7 is a schematic structural diagram of a message decryption apparatus according to Embodiment 6 of the present disclosure.

Correspondingly, this embodiment of the present disclosure further provides a message decryption apparatus. As shown in FIG. 7, the message decryption apparatus may include a message processing unit 601, an obtaining unit 602, and a decryption unit 603, as follows:

(1) Message Processing Unit 601:

The message processing unit 601 is configured to: obtain a data packet by means of a network, and perform a packet disassembly process on the data packet, to obtain an encrypted message.

(2) Obtaining Unit 602:

The obtaining unit 602 is configured to obtain a decryption request for the encrypted message, the decryption request including at least an identifier of a decryption routine and a decryption key.

(3) Decryption Unit 603:

The decryption unit 603 is configured to: identify the corresponding decryption routine according to the identifier of the decryption routine in the decryption request, and decrypt the encrypted message according to the key in the decryption request, to obtain a decrypted message.

For example, the decryption unit 603 may include an invocation subunit and a decryption subunit.

The invocation subunit is configured to invoke, by using an encryption interface, the decryption routine corresponding to the identifier.

The decryption subunit is configured to decrypt the encrypted message according to the key and the invoked decryption routine.

The identifier of the decryption routine may be a name of the decryption program. The decryption routine may be a decryption program developed by an enterprise itself, or may be a decryption program developed by a third party trusted by the enterprise. The decryption routine is generated based on a preset decryption algorithm. In this embodiment, before message decryption, a specified decryption routine may be installed on a decryption terminal. In actual application, the decryption routine may be a cryptographic service provider (CSP). In this case, the identifier of the decryption routine may be a name of the CSP.

For example, when a CSP having an encryption/decryption function is installed on the terminal, and a message requires encryption/decryption, the message is encrypted or decrypted by invoking the CSP. That is, one CSP is shared in encryption and decryption on the message.

In this embodiment, the key required for decryption may be used as a parameter of the decryption routine, to decrypt the encrypted message. When a symmetric encryption solution is used, the key required for decryption is the same as the foregoing key required for encryption. In this case, message encryption/decryption efficiency can be improved.

In certain embodiments, the message decryption apparatus in this embodiment may further include a determining unit.

The determining unit is configured to determine, before the obtaining unit obtains the decryption request for the encrypted message, whether a message type of the encrypted message is a preset message type requiring decryption.

In this case, the obtaining unit 602 is configured to obtain the decryption request for the encrypted message when the determining unit determines that the message type of the encrypted message is the preset message type requiring decryption.

In certain embodiments, the message decryption apparatus in this embodiment may further include a request unit and a receiving unit.

The request unit is configured to send a configuration information obtaining request to a server.

The receiving unit is configured to receive decryption configuration information that is returned by the server in response to the configuration information obtaining request, the decryption configuration information including: the identifier of the decryption routine, the decryption key, and the preset message type requiring decryption.

In some implementations, the foregoing units may be implemented as individual hardware components, or may be combined arbitrarily, or may be implemented as a same hardware component or several hardware components. For various implementations of the foregoing units, refer to the foregoing method embodiments. Details are not described herein again.

The message decryption apparatus may be integrated in a device such as a terminal, for example, may be installed on the terminal in a form of a client, software, or the like. The terminal may be a device such as a mobile phone, a tablet computer, or a PC.

It can be learned from the above that, in the message decryption apparatus in this embodiment, a data packet is obtained by using the message processing unit 601 by means of a network, and a packet disassembly process is performed on the data packet, to obtain an encrypted message; then, a decryption request for the encrypted message is obtained by using the obtaining unit 602, the decryption request including an identifier of a decryption routine and a decryption key; and the encrypted message is decrypted by using the decryption unit 603 according to the decryption routine corresponding to the identifier and the key, to obtain a decrypted message.

By means of this solution, an encrypted message may be decrypted according to a specified decryption routine and key, thereby avoiding that the message is decrypted by using an IM client application provided by an IM service provider. By means of this solution, an IM message can be viewed only on a particular terminal on which a specified decryption routine and key are installed. Because an unauthorized person cannot obtain a specified encryption routine and key, even if login information on the IM client application is stolen by the unauthorized person, the unauthorized person still cannot view the IM message after logging in to the IM client application on another terminal by using the stolen login information. Therefore, compared with the existing technology, this solution improves IM message security. For example, in this solution, an IM message in an enterprise can be controlled to be viewed only on a terminal on which an encryption/decryption routine and a key that are specified by the enterprise are installed, and cannot be viewed on a terminal on which the encryption/decryption routine and the key that are specified by the enterprise are not installed. For an enterprise, this solution greatly improves IM message security.

In addition, in this embodiment, an encryption routine may be designed by an enterprise itself, thereby improving encryption flexibility. Moreover, the encryption routine is not accessible to an IM service provider. Therefore, the IM service provider cannot learn specific implementation of an encryption algorithm. Even if encrypted message content is stored in a cloud of the service provider, the service provider cannot view actual content by means of decryption, thereby further improving IM message security.

Figure 8:
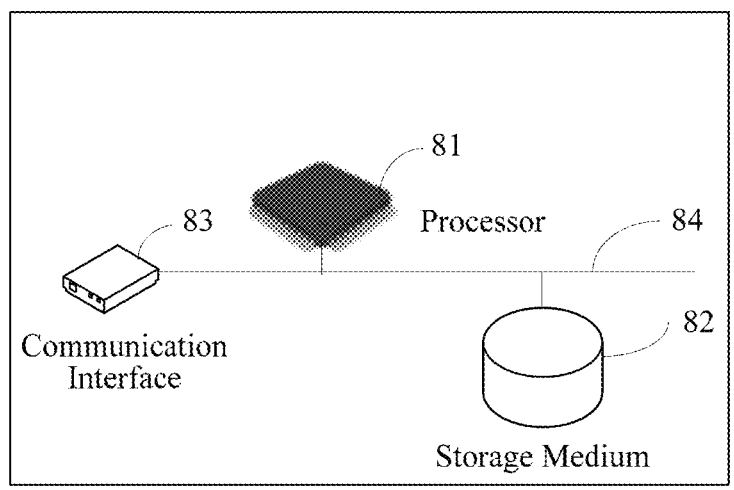
FIG. 8 is a schematic structural diagram of an apparatus used in a hardware implementation according to an embodiment.

Based on the foregoing scenarios, the apparatus provided in this embodiment may be used as an example of a hardware entity. As shown in FIG. 8, the apparatus includes a processor 81, a storage medium 82, and at least one communication interface 83. The processor 81, the storage medium 82, and the external communications interface 83 are all connected by using a bus 84. Various units and modules described herein may be implemented in whole or in part using the processor 81, non-tangible storage medium 82, and communication interface 83. In some embodiments, at least some of units and modules described herein may be implemented by the processor 81 executing instructions stored in the storage medium 82.

The message encryption apparatus in this embodiment of the present disclosure includes a plurality of units. The units may be disposed in a processor of a device, or may be respectively disposed in processors of different devices. When the units are disposed in a processor of a device functioning as a message encryption apparatus, the processor of the device performs the following processing:

obtaining an encryption request for a message, the encryption request including an identifier of an encryption routine and an encryption key;

identifying the corresponding encryption routine according to the identifier of the encryption program in the encryption request, and encrypting the message based on the key included in the encryption request, to obtain an encrypted message; and performing a packet assembly process on the encrypted message to obtain a corresponding data packet, and sending the data packet to a network.

In addition, based on a hardware structure of the server shown in FIG. 8, the obtaining unit, the encryption unit, and the sending and processing unit provided in the foregoing embodiments may be disposed in a storage medium of a device, or may be respectively disposed in storage media of different devices.

The plurality of units included in the message decryption apparatus in this embodiment of the present disclosure may be disposed in a processor of a device, or may be respectively disposed in processors of different devices. When the units are disposed in a processor of a device, the processor of the device performs the following processing:

obtaining a data packet by means of a network, and performing a packet disassembly process on the data packet, to obtain an encrypted message;

obtaining a decryption request for the encrypted message, the decryption request including at least an identifier of a decryption routine and a decryption key; and identifying the corresponding decryption routine according to the identifier of the decryption program in the decryption request, and decrypting the encrypted message according to the key in the decryption request, to obtain a decrypted message.

A person of ordinary skill in the technology may understand that all or some of the steps of the foregoing embodiments may be implemented by using hardware, or may be implemented by a program instructing relevant hardware. The program may be stored in a computer readable storage medium. The storage medium may include a read only memory (ROM), a random access memory (RAM), a magnetic disk, an optical disc, and the like.

An apparatus and method of encrypted communication, including a message encryption method and apparatus, and a message decryption method and apparatus provided in the embodiments of the present disclosure are described in detail above. The principle and implementations of the present disclosure are described herein through specific examples. The descriptions of the embodiments of the present disclosure are merely provided to help understand the method and core ideas of the present disclosure. In addition, a person skilled in the technology can make variations to the present disclosure in terms of the specific implementations and application scopes according to the ideas of the present disclosure. Therefore, the content of this specification shall not be construed as a limit to the present disclosure.

What is claimed is:

1. A method of encrypted communication by a terminal device, the method comprising:

sending a configuration information obtaining request to a server, the configuration information obtaining request including login information of an account;

receiving encryption configuration information that is provided by the server in response to the configuration information obtaining request, the encryption configuration information being associated with the account;

obtaining, by processing circuitry of the terminal device, an encryption request for a user message, the encryption request including an identifier of an encryption routine and an encryption key;

identifying the encryption routine according to the encryption configuration information and the identifier of the encryption routine included in the encryption request;

generating, by the processing circuitry of the terminal device, an encrypted message by encrypting the user message using the identified encryption routine and the encryption key included in the encryption request;

generating a data packet by performing a packet assembly process on the encrypted message; and sending the data packet to another device via a network.

2. The method according to claim 1, wherein the generating the encrypted message comprises:

invoking, by using an encryption interface, execution of the identified encryption routine to encrypt the user message according to the encryption key.

3. The method according to claim 1, further comprising, before performing the obtaining the encryption request:
  determining whether a message type of the user message is a preset message type requiring encryption; and
  performing the obtaining the encryption request for the user message when the message type of the user message is determined as the preset message type requiring encryption.

4. The method according to claim 3, wherein
  the encryption configuration information includes the identifier of the encryption routine, the encryption key, and the preset message type requiring encryption.

5. The method according to claim 1, wherein
  the account corresponds to an enterprise.

6. The method according to claim 1, further comprising:
  receiving the user message according to a user input via an input interface of the terminal device.

7. The method according to claim 1, further comprising:
  invoking, by using an encryption interface, a search for the encryption routine based on the identifier;
  generating and sending the data packet by performing the packet assembly process on the user message without encryption when the encryption routine is not found as a result of the search; and
  generating and sending the data packet by performing the packet assembly process on the encrypted message encrypted using the encryption routine when the encryption routine is found as the result of the search.

8. A method of encrypted communication by a terminal device, the method comprising:
  sending a configuration information obtaining request to a server, the configuration information obtaining request including login information of an account;
  receiving decryption configuration information that is provided by the server in response to the configuration information obtaining request, the decryption configuration information being associated with the account;
  receiving a data packet from another device via a network;
  obtaining an encrypted message from the data packet by performing a packet disassembly process on the data packet;
  obtaining, by processing circuitry of the terminal device, a decryption request for the encrypted message, the decryption request including an identifier of a decryption routine and a decryption key;
  identifying the decryption routine according to the decryption configuration information and the identifier of the decryption routine included in the decryption request; and
  decrypting, by the processing circuitry of the terminal device, the encrypted message to obtain a decrypted message using the identified decryption routine and the decryption key included in the decryption request.

9. The method according to claim 8, wherein the decrypting comprises:
  invoking, by using an encryption interface, execution of the identified decryption routine to decrypt the encrypted message according to the decryption key.

10. The method according to claim 8, further comprising, before performing the obtaining the decryption request:
  determining whether a message type of the encrypted message is a preset message type requiring decryption; and
  performing the obtaining the decryption request for the encrypted message when the message type of the encrypted message is determined as the preset message type requiring decryption.

11. The method according to claim 10, wherein
  the decryption configuration information includes the identifier of the decryption routine, the decryption key, and the preset message type requiring decryption.

12. The method according to claim 8, wherein
  the account corresponds to an enterprise.

13. The method according to claim 8, further comprising:
  invoking, by using an encryption interface, a search for the decryption routine based on the identifier;
  outputting the encrypted message for display without decryption when the decryption routine is not found as a result of the search; and
  performing the decrypting the encrypted message using the decryption routine and outputting the decrypted message for display when the decryption routine is found as the result of the search.

14. A terminal device, comprising:
  processing circuitry configured to:
    send a configuration information obtaining request to a server, the configuration information obtaining request including login information of an account;
    receive encryption configuration information that is provided by the server in response to the configuration information obtaining request, the encryption configuration information being associated with the account;
    obtain an encryption request for a user message, the encryption request including an identifier of an encryption routine and an encryption key;
    identify the encryption routine according to the encryption configuration information and the identifier of the encryption routine included in the encryption request; and
    generate an encrypted message by encrypting the user message using the identified encryption routine and the encryption key included in the encryption request; and
  communication circuitry configured to:
    generate a data packet by performing a packet assembly process on the encrypted message; and
    send the data packet to another device via a network.

15. The terminal device according to claim 14, wherein the processing circuitry is further configured to:
  invoke, by using an encryption interface, execution of the identified encryption routine to encrypt the user message according to the encryption key.

16. The terminal device according to claim 14, wherein the processing circuitry is further configured to:
  determine, before the processing circuitry obtains the encryption request for the user message, whether a message type of the user message is a preset message type requiring encryption; and
  obtain the encryption request for the user message when the processing circuitry determines that the message type of the user message is the preset message type requiring encryption.

17. The terminal device according to claim 16, wherein
  the encryption configuration information includes the identifier of the encryption routine, the encryption key, and the preset message type requiring encryption.

18. The terminal device according to claim 14, wherein
  the account corresponds to an enterprise.

19. The terminal device according to claim 14, wherein the processing circuitry is further configured to:
  receive the user message according to a user input via an input interface of the terminal device.

20. The terminal device according to claim 14, wherein the processing circuitry is further configured to:
  invoke, by using an encryption interface, a search for the encryption routine based on the identifier;
  generate and send the data packet by performing the packet assembly process on the user message without encryption when the encryption routine is not found as a result of the search; and
  generate and send the data packet by performing the packet assembly process on the encrypted message encrypted using the encryption routine when the encryption routine is found as the result of the search.

* * * * *